Patented Jan. 2, 1951

2,536,841

UNITED STATES PATENT OFFICE 2,536,841

LOW-TEMPERATURE OLEFIN POLYMERIZATION WITH SULFUR CONTAINING FRIEDEL-CRAFTS COMPLEX CATALYSTS

Ralph W. Dornte, Westfield, and John F. McKay, Jr., Elizabeth, N. J., assignors to Standard Oil Development Company, a corporation of Delaware No Drawing. Application December 4, 1945, Serial No. 632,804

10 Claims. (Cl. 260—85.3)

This invention relates to polymerization catalysts for low temperature reactions; relates particularly to polymerization catalysts of high solubility; and relates especially to complex catalysts of Friedel-Crafts active metal halide catalyst substances (such as aluminum chloride) with sulfur compounds, in solution in low-freezing, non-reactive solvents.

It has been found possible to produce a wide range of extremely valuable polymers and copolymers from isoolefins and multi-olefins such as isobutylene alone or in admixture with multiolefins such as butadiene, isoprene, piperylene, cyclopentadiene, dimethyl butadiene, dimethallyl, myrcene, and the like; or with substituted ethylenes such as the olefins known as styrene, alpha methyl styrene, para methyl styrene, chlor styrene, and the like. by a low temperature technique involving the cooling of the olefinic material to temperatures ranging from 0° C. to —164° C. and the addition to the cold material of a Friedel-Crafts catalyst.

However, difficulty is encountered in the reaction because of the relatively low solubility of most of the Friedel-Crafts catalysts in the reaction mixture and in available solvents. It is found that the obtainable molecular weight and the variety of obtainable polymers and copolymers is sharply restricted by the fact that most of the Friedel-Crafts catalysts, such as aluminum chloride, are either insoluble or very slightly soluble in the reaction mixture; and that a high molecular weight material and the possibility of polymerizing some substances at all, depends upon the use of a strong, relatively high concentration catalyst solution; and the further fact that the efficiency of the polymerization reaction is directly dependent upon the obtainable concentration of catalyst in the reaction mixture.

It is further found that the Friedel-Crafts type catalysts form highly stable complexes with a great many substances which effectively destroy the catalytic powers of the Friedel-Crafts substance and therefore a limited number only of substances can be admixed with the Friedel-Crafts metal halide substance without destroying its catalytic power.

It is now found, according to the present invention, that sulfur compounds form complexes with the Friedel-Crafts active metal halide substances which are of substantial solubility in a considerable number of solvents, and soluble in solvents in which the simple Friedel-Crafts metal halide catalyst substances are insoluble; in which complexes the catalytic power of the Friedel-Crafts metal is not noticeably reduced either by the complex-forming sulfur compound or by the solvent. In addition, these complexes provide a control for the copolymerization ratio between pluralities of olefinic monomers in a polymerization mixture by which the tendency of one monomer to polymerize out more rapidly than another can be substantially controlled, to yield a copolymer product containing a controlled ratio of monomer molecules therein different from that obtainable from the same olefinic mixture by the simple Friedel-Crafts catalysts.

That is, according to the present invention there are prepared soluble complexes between a Friedel-Crafts active metal halide substance such as aluminum chloride, or aluminum bromide, or titanium tetrachloride, or boron trifluoride, or stannic chloride and the like with an inorganic sulfur compound such as sulfur dioxide, sulfur sesquioxide. sulfur trioxide, sulfur tetraoxide, sulfur heptaoxide, sulfur chloride, sulfur dichloride, sulfur tetrachloride, sulfur tetrafluoride, sulfur hexafluoride, thionyl chloride, sulfuryl chloride, sulfuryl pyrochloride, sulfur mono oxytetrachloride ($S_2OCl_4$), sulfur tri oxytetrachloride, hydrogen sulfide and the like. Similar compounds of selenium and tellurium are similarly usable for various polymerization reactions. These complexes are found to be soluble in proportions ranging from 1% to 10% or in some instances higher in such solvents as carbon disulfide, ethyl and methyl chloride; and the halogenated hydrocarbons which are liquid at room temperature, generally, the lower aliphatic hydrocarbons including liquid ethane, liquid propane, liquid butane, liquid pentane, hexane, heptane, octane, petroleum naphtha, liquid ethylene, and a considerable range of the non-oxygen-containing organic compounds generally, and the like.

These solutions of Friedel-Crafts active metal halides with sulfur compounds, in solution, are potent and efficient polymerization catalysts for the polymerization and copolymerization of a wide range of substances which contain carbon to carbon double linkages, or unsaturated linkages, which, for the purposes of this specification, are olefins, and are defined as any substance containing an ethylene linkage without regard to the substituents replacing the ethylene hydrogens, whether other alkyl, aryl or aralkyl substances; whether or not containing oxygen, halogens or other substituents; the ethylene double linkage, if present, causing the substance to be regarded, for the purposes of this disclosure, as an olefin.

Thus the present invention polymerizes an olefin containing mixture, as above defined, by the application thereto of a complex catalyst containing a Friedel-Crafts active metal halide substance in complex union with a sulfur group compound; the catalyst complex being in solution in a solvent which has a freezing point below the freezing point of water, thereby being low freezing and which similarly forms no further complex with the dissolved Friedel-Crafts sulfur group substance complex; to yield an olefinic polymer or copolymer having a Staudinger molecular weight number ranging from 1000 to 500,000 or higher; the polymerization ratio, when two or more olefins are copolymerized, being controlled in part by the character and components of the catalyst complex used. Other objects and details of the invention will be apparent from the following description.

The raw material for the reaction of the present invention is an olefin, as above described. The preferred olefin is isobutylene, but many other olefins are directly usable including such substances as ethylene, propylene, the normal butylenes, the iso and normal pentenes, the iso and normal hexenes, the iso and normal heptenes; the normal and iso octenes (including di-isobutylene, triisobutylene; and the like), and the various normal and iso aliphatic olefins having from 3 to 20 carbon atoms per molecule, including the ordinary normal and iso olefins and also the dimer, trimer and tetramer of isobutylene, cyclopentene, cyclohexene and their alkyl and aryl derivatives; and similar substances. The raw materials of the invention also include such ethylenic unsaturates as styrene, which is phenyl ethylene, alpha methyl styrene, para methyl styrene, alpha chlor styrene, para chlor styrene, and the other halogen substituted styrenes as well as styrenes containing longer chain substituents up to about 5 carbon atoms per substituent chain. The raw materials also include the diolefins and the multi olefins having more than two double linkages, preferred substances including such compounds as butadiene, isoprene, piperylene, cyclopentadiene, cyclohexadiene, dimethyl butadiene, the various mono and poly ethyl substituted butadienes, these compounds and similar compounds containing propyl, butyl, pentyl, hexyl and heptyl substituents being likewise included. The raw materials also include the non-conjugated diolefins and multi olefins, of which dimethallyl is representative, and also the tri olefins and higher olefins, of which myrcene and allo-ocymene are representative; and, in fact, including, as far as is now known, any compound containing one or more double linkages. For the copolymerization, other monomers which may be used are found in the vinyl halides, the vinyl sulfides, the vinyl nitriles, the vinyl esters, the vinyl pyridenes, the vinylidene halides, esters and nitriles, and the like. Also the allyl and methallyl derivatives of the previously listed substances are suitable monomers for the polymerization. It will be noted that these substances are unsaturates, each containing at least one ethylenic linkage.

The material is further prepared for polymerization by cooling to a temperature below 0° C., preferably within the range between 0° C. and −164° C. or better; between −40° C. and −103° C. The cooling may be obtained by the use of a cooling jacket upon the reactor in which the olefinic material is placed, or it may be obtained by the direct admixture of a refrigerant, with or without a diluent, to the polymerization material. If a refrigerating jacket is used, practically any convenient refrigerant is suitable including such substances as liquid carbon dioxide, liquid sulfur dioxide, liquid fluorine substituted organic compounds, liquid propane, liquid ethane, liquid ethylene, liquid methane, and even, on occasion, liquid nitrogen, or liquid air, although the temperatures produced by these compounds usually are undesirably low and low enough to solidify most of the olefinic polymerizates. When the refrigerant is used as an internal refrigerant, a much more restricted scope of substances is satisfactory. These, however, include such substances as liquid or solid carbon dioxide, liquid propane, liquid ethane, liquid ethylene, liquid methane, and occasionally, liquid nitrogen, although the latter yields too low a temperature for most purposes. For the higher range of temperatures, such substances as liquid methyl chloride and liquid ethyl chloride under vacuum may occasionally be used. The principal requirement for the refrigerant is that it shall be inert with respect to the catalyst and the polymerization reaction, and shall have a sufficiently low boiling point, either at atmospheric pressure or at reduced pressure, or even under elevated pressure, which is occasionally the case with liquid methane.

There may also be added, if desired, an inert diluent, for which purposes such substances as butane, pentane, hexane, heptane, octane or mixtures thereof including the lighter petroleum naphthas, are particularly suitable, as well as the halogenated hydrocarbons which are liquid at polymerization temperature, are also particularly suitable.

When the olefinic material has been cooled to the desired temperature in the presence or absence of a diluent, as desired, it is ready for the polymerization reaction. According to the present invention, the polymerization catalyst is prepared as a complex of a Friedel-Crafts active metal halide with a sulfur compound. Particularly suitable substances for the formation of the catalyst are aluminum chloride, aluminum bromide, titanium tetra chloride, boron trifluoride, stannic chloride and the like.

Considerable range in choice of Friedel-Crafts active metal halide substances is however available and the list is particularly well given by N. O. Calloway in his article on the "Friedel-Crafts Synthesis" printed in the issue of "Chemical Reviews" published for the American Chemical Society at Baltimore in 1935, in volume XVII, No. 3, the article beginning on page 327, the list being particularly well shown on page 375.

For the second member of the complex, such substances as sulfur dioxide, sulfur mono chloride, thionyl chloride, hydrogen sulfide, sulfur trioxide, sulfuryl chloride and the like, as above listed, may be used. The Friedel-Crafts active metal halide and the sulfur compound may be mixed in any convenient way, and in proportions within the range of 0.1 mol of the sulfur type compound per mol of Friedel-Crafts metal halide to 2 mols of sulfur type compound per mol of Friedel-Crafts metal halide. The preferred mol ratio is one mol of sulfur compound to one mol of aluminum chloride ($AlCl_3$).

The catalyst complex may be isolated and then dissolved in a suitable solvent or the sulfur compound and the active metal halide may be added to a solvent such as methyl or ethyl chloride in the desired mol ratio usually 1 mol of sulfur compound to one mol of active metal halide although the mol ratio may be selected from the range 0.1 to 10 in certain cases if so desired. Examples of this type may be cited. Sulfur dioxide may be used in substantially any mol ratio to aluminum chloride in the catalyst solvent. Hydrogen sulfide on the other hand may be used at mol ratios up to and including 2 but at a mol ratio of 3.5 ($H_2S/AlCl_3$) the catalytic activity of the catalyst solution is destroyed. Deactivation of the catalytic effect of the metal halide for low temperature polymerization of isoolefins is the main factor determining the maximum mol ratio of sulfur compound to the active metal halide. In the case of hydrogen sulfide the two complexes $Al_2Cl_6.2H_2S$ and $Al_2Cl_6.4H_2S$ have been identified and shown to be active polymerizing catalyst complexes whereas an inactive rather unstable complex $Al_2Cl_6.7H_2S$ is presumably formed at 3.5 mol ratio to account for the deactivation. The behavior of sulfur dioxide and hydrogen sulfide illustrate the specific effects which are encountered going from one type of sulfur compound to another.

The catalyst complex may, in some instances, be added directly to the polymerization mixture, especially when, as is the case with a limited number, it is liquid at room temperature, permitting it to be sprayed onto the rapidly stirred, cold, olefinic material. Usually, however, it is preferable to use the catalyst complex in solution in a low-freezing, non-complex-forming solvent in a concentration ranging from 0.1% to about 10%. The low-freezing, non-complex-forming solvent is defined as any solvent having a freezing point below 0° C., thereby being low-freezing with respect to water. The catalyst solvent likewise should be non-complex-forming; the requirements for this characteristic being particularly well shown by Findlay in his text on "The Phase Rule and its Applications" the 6th edition, by Longmans Green & Co., New York. According to Findlay a solvent is non-complex-forming when, upon addition of the solvent as a vapor to the solute at constant temperature; the addition as vapor to the catalyst leads to a continuous change in the composition of the catalyst phase and to a continuous increase in the pressure at which the gaseous solvent is added. Similarly, the withdrawal at constant temperature of the solvent in gas form from a non-complex-forming solute from the wet catalyst phase which has been equilibriated with a saturated solution of the catalyst, will lead to a continuous change in the composition of the catalyst phase and in a continuous diminution of the vapor pressure of the solvent as it is removed in gaseous form. In comparison, when a complex is formed between solute and solvent, the continued addition of the solvent vapor at constant temperature to the catalyst solute causes an increase in pressure until at a definite value of the pressure a dissociating compound is formed, at which time the vapor pressure becomes constant and remains so until all of the original catalyst phase has been converted. During the withdrawal of the solvent vapor from the complex compound of solvent and catalyst at constant temperature, the pressure remains constant so long as any of the dissociating compound is present. Upon this definition all of the catalyst solvents above listed are non-complex-forming; and the invention expressly includes all those others not listed which obey the definition herein presented.

The catalyst complex either as such or in solution is added to the cold olefinic material in any convenient way which will obtain a rapid and effective dispersion of catalyst material into the cold olefinic material; as by spraying the liquid catalyst or catalyst solution onto the surface of the rapidly stirred, cold, olefinic material, or as a high pressure solid jet into the body of the rapidly stirred, cold, olefinic material, or in the form of concentric jets of olefin and catalyst, either through free fall or in a polymerization conduit, or the like.

The polymerization reaction proceeds rapidly to yield an olefinic polymer ranging from an oily liquid having a molecular weight of approximately 1000, up to a solid polymer having a molecular weight of Staudinger molecular weight number from 250,000 to 500,000 corresponding to actual molecular weights, as determined by osmotic pressure methods ranging from 5 million to 15 million as shown by Flory in his article published in the Journal of the American Chemical Society, volume 65, page 372 (1943).

The resulting polymer may be substantially saturated if it is a polymer of the simple olefins, or may contain a substantial amount of residual unsaturation, if it is a copolymer containing substantial amounts of diolefinic or multi-olefinic material. If the unsaturation remaining has a value above about 0.1 to 0.5, the polymer is subject to a curing reaction or vulcanization reaction with sulfur especially in the presence of a sulfurization aid such as tetra methyl thiuram disulfide; or by such compounds as para quinone dioxime or its analogs, homologs and esters, or by a dinitroso compound.

The characteristics of the cured polymer may also be considerably improved by the addition thereto of a considerable range of compounding agents including carbon black, stearic acid, zinc oxide, and the like.

A suitable compounding formula is as follows:

RECIPE 1

| | Parts |
|---|---|
| Copolymer | 100 |
| Stearic acid | 3 |
| Zinc oxide | 5 |
| Carbon black | 50 |
| Sulfur | 2 |
| Tetramethyl thiuram disulfide | 1 |
| Mercapto benzo thiazole | 0.5 |

This compound is conveniently prepared on the open roll mill, the polymer being placed on the mill first, milled briefly until it is reasonably plastic, then the stearic acid, zinc oxide and carbon black added, then the sulfur, and then the curing aids. The polymer may then be shaped, as desired, preferably in the mold, under pressure, and cured at temperatures ranging from 250° F. to 375° F. for an appropriate time ranging from 1 minute to several hours, depending upon the temperature and the character of the sulfurization aid. The resulting cured polymer shows a tensile strength ranging from 1500 to 4500 pounds per square inch, a modulus at 300% extension ranging from 100 to 1000 pounds, and an elongation at break ranging from 500% to 1200%.

In this recipe the stearic acid may be varied in amount from 0 to 10 or 15 parts; the zinc oxide may be varied from 0 to about 50 parts, the carbon black preferably is used in at least 10%, but for most purposes may vary from 0 to 200 parts. The sulfur likewise may vary from about 2 to about 5 parts, the tetramethyl thiuram disulfide may vary from about 0.1 part to about 3 parts and the mercapto benzo thiazole may vary from about 0 to about 2 parts.

EXAMPLE 1

A complex of aluminum chloride and sulfur dioxide was prepared by passing gaseous $SO_2$ over aluminum chloride at a temperature of 50° C. until a constant weight was obtained indicating that no more $SO_2$ could be absorbed. When this stage was reached, the current of $SO_2$ was discontinued and the aluminum chloride-sulfur dioxide complex was dissolved in methyl chloride at a temperature of approximately −24° C.; a solution to the extent of approximately 0.19 g. $AlCl_3/300$ cc. $CH_3Cl$.

A series of 5 polymerization mixtures were then prepared according to the following Table I:

*Table I*

| Designation | B—0 | B—2.5 | B—3 | B—8 | S—60 |
|---|---|---|---|---|---|
| Isobutylene, g | 220 | 220 | 220 | 220 | 80 |
| Isoprene, g | | 5.5 | 6.6 | 17.8 | |
| Methyl chloride, g | 1,160 | 1,160 | 1,160 | 1,160 | 850 |
| Styrene, g | | | | | 120 |

For comparison purposes a catalyst solution consisting of 0.2 gram of aluminum chloride in 100 ccs. of methyl chloride was used. Respective portions of each of the mixtures were polymerized by the aluminum chloride sulfur dioxide catalyst and by the simple aluminum chloride solution catalyst.

Polymerizations of B—2.5 and B—8 feeds were carried out at −102° C. with the $Al_2Cl_6.SO_2$ catalyst and the results are given in Table II. The B—2.5 reactions were varied in conversion from 38–87% and in this range the polymer properties are more uniform than obtained with aluminum chloride catalyst. The variations found were as follows: per cent low polymer 5.0–21.0, unsaturation 0.95–1.47 mol per cent, Staudinger molecular weight 57,000–82,000 and Mooney viscosities 74–84. The tread stock vulcanizates are uniform in properties; the tensile values after 40 minutes' cure at 307° F. are 2800–3000, the 300% moduli are 450–570 and the elongations are 700–750%. The complex $Al_2Cl_6 SO_2$ with B—8 feeds produced a higher Mooney value (46) in the polymer than usually obtained with $AlCl_3$ although the vulcanizate properties are only typical.

The B—2, B—3 and B—8 polymers were compounded according to the following Recipe 2:

| Polymer | 100 | 100 |
|---|---|---|
| Zinc oxide | 5 | 5 |
| Stearic acid | 3 | 3 |
| Tetra methyl thiuram disulfide | 1 | 1 |
| Mercapto benzo thiazole | 0.5 | — |
| Cabot #9 (carbon black) | 50 | 10 |
| Sulfur | 2 | 1.0 |

These mixtures were then cured in the mold to obtain the characteristics above pointed out in the polymerization above outlined.

EXAMPLE 2

A complex of aluminum chloride and hydrogen sulfide was prepared by condensing an excess of liquid hydrogen sulfide upon a mass of aluminum chloride at a temperature of −78° C., the material being allowed to warm up and the unreacted hydrogen sulfide evaporated off; the condensation and volatilization being repeated until a constant weight was obtained.

This catalyst complex was then dissolved in methyl chloride at approximately −24° C., to a solution equivalent to 0.18 g. $AlCl_3/100$ cc. $CH_3Cl$.

This catalyst solution was then used to polymerize other portions of the mixtures prepared as indicated above in Table I.

The B—2.5 and B—3 mixtures after polymerization were compounded according to the above Recipe 2 and the resulting mixtures were cured, as shown in the subjoined Table III.

The complex $Al_2Cl_6.H_2S$ was used as a catalyst to polymerize B—0, B—3, B—8 and S—60 feeds with a 3:1 diluent ratio of methyl chloride. The conversion data, polymer and vulcanizate properties are shown in Table III. The B—3 polymers were obtained at low catalyst efficiencies (150–210 g. polymer-g. $AlCl_3$), had a high percentage of low molecular weight components and low average molecular weights. The Mooney viscosities (34–38) were remarkably uniform for all conversions (47–81%) whereas the control polymers had Mooney viscosities decreasing from 86 at 64% conversion to 45 at 81% conversion. This improved uniformity is associated with a higher content of low molecular weight components at all conversions.

It will be noted from these results that an excellent polymer was obtained of improved uniformity and superior cured properties.

It will be noted that the B—3 polymers and the controls had equivalent cured properties in general. It may also be noted that the hydrogen sulfide complex produced simple polyisobutylene and copolymers of isobutylene-styrene of greatly improved homogeneity, as was indicated by a substantial reduction in the difference between the feed composition and the copolymer composition. An S—60 feed with $AlCl_3$ catalyst yielded at 72–80% conversion a copolymer containing only 50–52% styrene, whereas the copolymer formed by $Al_2Cl_6.H_2S$ contained 58–59% styrene at the same conversions. The intrinsic viscosity of the copolymer obtained with the sulfur complex catalyst was equivalent to that obtained with aluminum chloride. These results indicate that the copolymerization ratios of styrene and isobutylene have been changed by this complex catalyst which gave no characteristic yellowish brown color during the polymerization.

Table II.—*Butyl polymerizations by the complex* $AlCl_3 \cdot 1/2 \, SO_2$ *at* $-102°$ C.

| Exp. No. | Feed | Conversion, Per Cent | Catalyst Efficiency g. polymer / g. AlCl₃ | Low Polymer, Wt. Per Cent | Unsaturation, Mole Per Cent (ICl) | Mol. wt. x 10⁻³ Staudinger | Mol. wt. x 10⁻³ Viscosity Average |
|---|---|---|---|---|---|---|---|
| 257—26—5 | B—2.5 | 38 | 260 | 5.9 | 1.34 | 82 | 1,150 |
| 26—3 | B—2.5 | 50 | 200 | 5.9 | 1.36 | 74 | 1,000 |
| 26—4 | B—2.5 | 65 | 400 | 5.0 | 1.36 | 68 | 870 |
| 26—6 | B—2.5 | 71 | 510 | 5.4 | .95 | 71 | 930 |
| 26—8 | B—2.5 | 87 | 510 | 21.0 | 1.47 | 57 | 660 |
| 26—9 | B—8 | 43 | 150 | 23.8 | 3.19 | 38 | 350 |
| 26—10 | B—8 | 59 | 130 | 82.0 | 3.44 | 36 | 350 |

| Exp. No. | Mooney Viscosity @ 212° F. | Tread Stock Cures (Tensile), 300% Modulus, Elongation, @ 307°F. 20' | 40' | 60' | 80' | 120' |
|---|---|---|---|---|---|---|
| 257—26—5 | 74 | | 3000—560—700 | 2900—650—650 | 3000—770—700 | |
| 26—3 | 80 | 3000—310—900 | 3000—450—750 | 3000—560—750 | | 2900—600—650 |
| 26—4 | 81 | 3000—350—850 | 3000—570—750 | 2900—630—700 | | 2900—760—650 |
| 26—6 | 79 | 3000—360—800 | 3000—570—750 | 2900—580—700 | | 3000—750—650 |
| 26—8 | 84 | 2700—350—850 | 2800—520—750 | 3000—620—750 | | 2900—820—650 |
| 26—9 | 57 | | 2500—1440—450 | 2500—1640—400 | 2200—1580—350 | |
| 26—10 | 46 | 2500—880—400 | 2400—1330—450 | 2200—1590—400 | | 2400—1590—400 |

Catalyst Solution: 0.25 g. $AlCl_3 \cdot 1/2 \, SO_2$/100 cc. $CH_3Cl$=0.19 g. $AlCl_3$/100 cc. $CH_3Cl$.
Diluent Ratio: 3/1.

Table III.—*Polymerizations by* $Al_2Cl_6 \cdot H_2S$

| Exp. No. | Feed 3:1 | Conversion, Wt. Per cent | Catalyst Efficiency g. polymer/ g. AlCl₃ | Low Polymer, Wt. Per Cent | Unsaturation Mol Per cent ICl | Intrinsic Viscosity | Mol. Wt. × 10⁻³ Staudinger | Mol. Wt. × 10⁻³ Viscosity Average | Mooney Viscosity @ 212° F. |
|---|---|---|---|---|---|---|---|---|---|
| | | | | | | | | | |

Catalyst $Al_2Cl_6 \cdot H_2S$ 0.20 g./100 cc. $CH_3Cl$

| Exp. No. | Feed 3:1 | Conv. Wt% | Cat. Eff. | Low Polymer % | Unsat. ICl | Intrinsic Visc. | Staudinger | Visc. Avg. | Mooney |
|---|---|---|---|---|---|---|---|---|---|
| 337—1—1 | B—0 | 57 | 410 | 10.3 | | 2.85 | 89 | 1,350 | |
| 337—1—2 | B—3 | 47 | 150 | 28.9 | 1.59 | 1.11 | 35 | 310 | 46 |
| 337—1—6 | ——do—— | 73 | 210 | 50.3 | 1.94 | 1.21 | 38 | 355 | 59 |
| 337—1—3 | ——do—— | 77 | 200 | 16.9 | 1.87 | 1.08 | 34 | 300 | 43 |
| 337—1—4 | ——do—— | 81 | 180 | 29.8 | 2.02 | 1.08 | 34 | 300 | 42 |
| 337—1—9 | B—3 (Control) | 64 | 420 | 9.9 | 2.16 | 1.77 | 56 | 640 | 86 |
| 337—1—10 | ——do—— | 69 | 690 | 6.6 | 1.82 | 1.85 | 58 | 690 | 87 |
| 337—1—11 | ——do—— | 81 | | 22.3 | 1.87 | 1.35 | 43 | 420 | 45 |
| 337—1—5 | B—8 | 18 | 50 | 87.8 | 3.95 | .70 | 22 | 150 | |
| 337—1—7 | S—60 | 72 | 80 | | | .77 | (59.2% Styrene) | | |
| 337—1—8 | ——do—— | 80 | 160 | | | .95 | (58.2% Styrene) | | |
| 337—1—12 | S—60 (Control) | 100 | 480 | | | .92 | (60.2% Styrene) | | |

| Exp. No. | Parts Carbon Black | Tensile, 300% Modulus, Elongation @ 307° F. 20' | 40' | 80' | 120' |
|---|---|---|---|---|---|
| 337—1—1 | 50 | | 2500—480—700 | 2700—600—700 | 2200—760—550 |
| 337—1—2 | 50 | 2800—370—850 | 2900—570—700 | 2800—850—600 | 2800—960—600 |
| | 10 | 3800 950 | 3700 850 | 3300 750 | 3000 700 |
| 337—1—6 | 50 | 2700—390—800 | 3000—640—700 | 2900—900—600 | 2800— 900— 600 |
| | 10 | 3000 950 | 3200 900 | 3100 750 | 2400 700 |
| 337—1—3 | 50 | 2700—360—800 | 2800—630—700 | 2700—930—600 | 2700—1040—600 |
| | 10 | 3100 900 | 3300 850 | 2800 700 | 2000 650 |
| 337—1—4 | 50 | 2900—460—750 | 2900—740—650 | 2900—980—600 | 2800—1080—550 |
| | 10 | 4000 840 | 4000 800 | 2900 700 | 2500 600 |
| 337—1—9 | 50 | 3100—400—800 | 3000—620—700 | 3000—830—600 | 3100— 970— 600 |
| | 10 | 4000 900 | 4200 800 | 3700 750 | 3600 750 |
| 337—1—10 | 50 | 2700—330—850 | 2700—490—750 | 2800—700—700 | 2800—820—650 |
| | 10 | 3200 850 | 2900 750 | 2900 650 | 2800 660 |
| 337—1—11 | 50 | 1500—690—700 | 1800—730—600 | 1800—780—600 | 1700—880—500 |
| 337—1—5 | 10 | 600 750 | 1000 900 | 800 950 | 600 1000 |
| 337—1—7 | | | | | |
| 337—1—8 | | | | | |
| 337—1—12 | | | | | |

EXAMPLE 3

A catalyst complex was prepared by suspending 10 parts of aluminum chloride in 250 parts of methyl chloride to which suspension there was then added 10.1 parts of sulfur mono chloride. The aluminum chloride dissolved rapidly in the methyl chloride in the presence of the sulfur chloride to give a dark red solution which, upon evaporation, and heating to 50° C., yielded a red, viscous liquid whose composition was found to be $AlCl_3 \cdot S_2Cl_2$. This material was found to be a moderately good catalyst for simple polyisobutylene and for the copolymers of isobutylene with a diolefin or mono olefin, as shown in Table I. The molecular weights were not any higher than the molecular weights obtainable with aluminum chloride alone, but a much more uniform product was obtained and the catalyst was much less easily poisoned by impurities in the feed.

EXAMPLE 4

A complex with thionyl chloride was prepared by suspending approximately 10 parts of aluminum chloride in 250 parts of methyl chloride and adding to the mixtures various amounts of thionyl chloride in the proportions of 1 mol, 2 mols and 100 mols. The first two mixtures were then evaporated and heated to a temperature of +50° C., yielding a yellow brown viscous liquid residue. The complexes containing the 1 and 2 mol ratios of thionyl chloride were readily soluble in methyl chloride and were found to be extremely active polymerization catalysts over a wide range of concentration: solutions as low as 0.09 gram of complex per 100 parts of methyl chloride being powerful and efficient catalysts. The 100 mol ratio was found to be a usable catalyst for isobutylene and for the copolymerization of isobutylene and styrene and the polymers were highly uniform but of undesirably low molecular weight.

EXAMPLE 5

The catalyst of the present invention is applicable to low temperature olefinic polymerization reactions in general without regard to the particular olefinic materials polymerized. A particularly valuable copolymer is the material consisting of a major proportion of a diolefin such as butadiene with a minor proportion of a mono olefin such as the actene obtained by a doubling up of isobutylene.

A mixture was prepared consisting of 40 parts by weight of the octene identified in the art as di-isobutylene with 60 parts by weight of butadiene. This material was cooled to a temperature of approximately −25° C. by the addition thereto of a small but continuing stream of liquid propane, the amount being insufficient to carry the temperature to −40° C.

The catalyst solution was prepared as in Example 1 by passing gaseous sulfur dioxide over aluminum chloride at 50° C. until constant weight was obtained. The catalyst was dissolved in ethyl chloride at a temperature of approximately +12° C. to yield a catalyst solution containing approximately 5.0 grams of aluminum chloride (as a complex) per 100 cc. of ethyl chloride. The catalyst solution was added in the form of a high pressure jet to the rapidly stirred butadiene-octene mixture at −25° C., sufficient propane being added during the addition of the catalyst to keep the temperature between −25° C. and −15° C. The reaction proceeded at good speed, the rate being to a considerable extent determined by the rate of addition of catalyst until the reaction was approximately 60% to 80% complete. At this point the supply of catalyst was interrupted, leaving sufficient catalyst solvent, unreacted components and refrigerant present to keep the material in a viscous solution. This solution was then drained out from the reactor into a heated kneader in which the residual refrigerant, olefins and catalyst solvent were vaporized out and the resulting polymer partly melted.

The resulting polymer was found to be heat bodyable and to be strongly heat resistant. As produced, before heating, it was found to be readily soluble in a wide range of solvents including hydrocarbons generally, linseed oil, paint thinners in general, and the like. This polymer is extremely valuable as a paint and varnish resin and as a thermosetting molding compound with a wide range of fillers including wood, flour, cotton linters, ground cork, fibrous fabrics generally whether woven, spun or filled and inorganic pigments in general.

EXAMPLE 6

An olefinic mixture was prepared consisting of approximately 60 parts by weight of styrene and 40 parts by weight of isobutylene. This material was cooled by the addition thereto of a substantial quantity of liquid ethane to a temperature of approximately −85° C. To this mixture there was then added a substantial portion of the catalyst disclosed in Example 2. The catalyst was added in the form of a small high-pressure jet into the body of the rapidly stirred olefinc mixture, the addition of catalyst being continued until from 65% to 85% of the styrene and isobutylene were copolymerized. The viscous solution of polymer in catalyst solvent and refrigerant was then discharged into a tank of warm water to volatilize out the unreacted components, the catalyst solvent, the refrigerant, etc. and yield a slurry of solid polymer in water. The polymer was then strained from the water slurry and dried to yield a high grade solid molding resin of good plasticity, satisfactory softening point, and excellent strength without brittleness.

EXAMPLE 7

A mixture was prepared as in Example 5 but using approximately 40 parts by volume of isoprene with 60 parts by volume of octene. This material was polymerized as in Example 5 to yield a high grade polymer somewhat rubbery or leathery in character. This polymer was less readily thickened by heat, but was readily soluble in hydrocarbon solvents generally. It was found to be reactive with sulfur, especially in the presence of tetramethyl thiuram disulfide to yield a very high grade leathery polymer having a small but substantial elongation at break. This material was found to be an excellent substitute for leather, with the added advantage that before curing it was thermoplastic and could be molded into any desired shape.

EXAMPLE 8

A mixture was prepared consisting of normal pentene and dimethyl butadiene in the proportion of 50 parts of each. This material was cooled by the addition of liquid ethylene to a temperature of approximately −100° C. and was polymerized by the addition thereto of the catalyst solution disclosed in Example 1. The resulting polymer was an excellent thermosetting, thermoplastic, hydrocarbon-soluble, solid resin which was particularly adapted both to thermosetting and to a pseudo-vulcanizing by sulfur and tetramethyl thiuram disulfide or by paraquinone dioxime, or by a dinitroso compound such as dinitroso benzene, or dinitroso cymene, or dinitroso naphthalene or the like.

In the above examples it is found that in no instance does the polymerization proceed in the proportion in which the component monomers are present. Isobutylene is more readily polymerizable at low temperature than are either butadiene or isoprene when aluminum chloride in solution in ethyl or methyl chloride is used. The present catalysts, however, yield a polymerization ratio which is much closer to that in which the components are present. This is particularly so with mixtures containing dimethyl butadiene, in which the polymerization favors the dimethyl butadiene when aluminum chloride alone is used. Accordingly, when the catalyst complex solution of the present invention is used, the polymer prepared near the close of the reaction is prepared from a mixture of monomers much more nearly that present at the beginning of the reaction, and in consequence a much more uniform polymer is obtained than is otherwise possible. It may be noted that when isobutylene and butadiene are mixed in the proportion of 70 and 30, and polymerized by aluminum chloride in ethyl or methyl chloride, only approximately 3 parts of butadiene are polymerized to 97 parts of isobutylene. On the other hand, the catalyst of the present invention yields a polymerization ratio much closer to that in which the olefinic compounds are present and accordingly a 3% diene polymer can be obtained from a mixture of isobutylene and butadiene much poorer in butadiene.

Thus the process of the invention polymerizes olefinic material at a low temperature by the application thereto of sulfur-containing complexes of Friedel-Crafts active metal halides to yield high molecular weight linear polymers.

While there are above disclosed but a limited number of embodiments of the invention, it is possible to produce still other embodiments without departing from the inventive concept herein disclosed and it is therefore desired that only such limitations be imposed on the appended claims as are stated therein or required by the prior art.

The invention claimed is:

1. A low temperature polymerization process comprising the steps in combination of cooling a mixture of a monoolefin and a multiolefin to a temperature within the range between 0° C. and —164° C., and adding thereto a polymerization catalyst which is liquid at the polymerization temperature comprising a dissolved Friedel-Crafts active metal halide complex with a nonmetallic inorganic sulfur containing compound, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

2. A low temperature polymerization process comprising the steps in combination of cooling a mixture of a monoolefin and a multiolefin to a temperature within the range between 0° C. and —164° C., and adding thereto a polymerization catalyst which is liquid at the polymerization temperature comprising a dissolved Friedel-Crafts active metal halide complex with a nonmetallic inorganic sulfur and oxygen containing compound, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

3. A low temperature polymerization process comprising the steps in combination of cooling a mixture of a monoolefin and a multi-olefin to a temperature within the range between 0° C. and —164° C., and adding thereto a polymerization catalyst which is liquid at the polymerization temperature comprising a dissolved Friedel-Crafts active metal halide complex with a nonmetallic inorganic sulfur and halogen containing compound, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

4. A low temperature polymerization process comprising the steps in combination of cooling a mixture of a monoolefin and a multi-olefin to a temperature within the range between 0° C. and —164° C., and adding thereto a polymerization catalyst which is liquid at the polymerization temperature comprising a dissolved Friedel-Crafts active metal halide complex with a nonmetallic inorganic sulfur and chlorine containing compound, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

5. A low temperature polymerization process comprising the steps in combination of cooling a mixture of a monoolefin and a multi-olefin to a temperature within the range between 0° C. and —164° C., and adding thereto a polymerization catalyst which is liquid at the polymerization temperature comprising a dissolved Friedel-Crafts active metal halide complex with sulfur dioxide, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

6. A low temperature polymerization process comprising the steps in combination of cooling a mixture of a monoolefin and a multi-olefin to a temperature within the range between 0° C. and —164° C., and adding thereto a polymerization catalyst which is liquid at the polymerization temperature comprising a dissolved Friedel-Crafts active metal halide complex with hydrogen sulfide, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

7. A low temperature polymerization process comprising the steps in combination of cooling a mixture of a monoolefin and a multi-olefin to a temperature within the range between 0° C. and —164° C., and adding thereto a polymerization catalyst which is liquid at the polymerization temperature comprising a dissolved Friedel-Crafts active metal halide complex with sulfur chloride, the catalyst having a high solubility and being in solution in a low-freezing, noncomplex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

8. A low temperature polymerization process comprising the steps in combination of cooling a mixture of a monoolefin and a multi-olefin to a temperature within the range between 0° C. and −164° C., and adding thereto a polymerization catalyst which is liquid at the polymerization temperature comprising a dissolved Friedel-Crafts active metal halide complex with sulfur monochloride, the catalyst having a high solubility and being in solution in a low-freezing, non-complex-forming solvent within the range between 0.1% and 10% in an amount sufficient to produce a desired percentage polymerization of unsaturates present to produce a high molecular weight polymer having a Staudinger molecular weight number within the range between 1,000 and 500,000.

9. In a polymerization process conducted at a temperature within the range between 0° C. and −164° C. the step of adding to a cold olefinic material a complex of aluminum chloride with hydrogen sulfide in solution in methyl chloride within the range between 0.1% and 10% in an amount sufficient to produce a desired percentage polymerization of unsaturates present to produce a high molecular weight polymer having a Staudinger molecular weight number within the range between 1,000 and 500,000 in a concentration within the range between 0.1% and 10%.

10. In a polymerization process conducted at a temperature within the range between 0° C., and −164° C. the step of adding to a cold olefinic material a complex of aluminum chloride with sulfur chloride in solution in methyl chloride within the range between 0.1% and 10% in an amount sufficient to produce a desired percentage polymerization of unsaturates present to produce a high molecular weight polymer having a Staudinger molecular weight number within the range between 1,000 and 500,000 in a concentration within the range between 0.1% and 10%.

RALPH W. DORNTE.
JOHN F. McKAY, Jr.

REFERENCES CITED

The following references are of record in the file of this patent:

UNITED STATES PATENTS

| Number | Name | Date |
| --- | --- | --- |
| 1,671,517 | Edeleanu | May 29, 1928 |
| 2,085,535 | Langedijk | June 29, 1937 |
| 2,142,980 | Huijser | Jan. 3, 1939 |
| 2,245,721 | Ross et al. | June 17, 1941 |
| 2,330,761 | Tongberg | Sept. 28, 1943 |
| 2,354,652 | Carmody et al. | Aug. 1, 1944 |
| 2,381,439 | D'Ouville et al. | Aug. 7, 1945 |
| 2,397,945 | Burney et al. | Apr. 9, 1946 |